US009495423B2

(12) United States Patent
Pan et al.

(10) Patent No.: US 9,495,423 B2
(45) Date of Patent: Nov. 15, 2016

(54) PREFETCHING RDF TRIPLE DATA

(71) Applicant: International Business Machines Corporation, Armonk, NY (US)

(72) Inventors: Yue Pan, Beijing (CN); Xing Zhi Sun, Beijing (CN); Qing Fa Wang, Beijing (CN); Shuo Wu, Beijing (CN); Lin Hao Xu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 453 days.

(21) Appl. No.: 14/049,753

(22) Filed: Oct. 9, 2013

(65) Prior Publication Data
US 2014/0040283 A1 Feb. 6, 2014

Related U.S. Application Data

(63) Continuation of application No. 13/305,116, filed on Nov. 28, 2011, now abandoned.

(30) Foreign Application Priority Data

Nov. 29, 2010 (CN) .......................... 2010 1 0577037

(51) Int. Cl.
*G06F 17/30* (2006.01)
(52) U.S. Cl.
CPC ..... *G06F 17/3053* (2013.01); *G06F 17/30533* (2013.01); *G06F 17/30902* (2013.01)
(58) Field of Classification Search
CPC ............. G06F 17/30867; G06F 17/30; G06F 17/30477; G06F 17/30536; G06F 17/30569; G06F 17/30533
See application file for complete search history.

(56) References Cited

U.S. PATENT DOCUMENTS

| 6,366,904 | B1 | 4/2002 | Benhadda et al. |
| 2003/0145022 | A1 | 7/2003 | Dingley |

(Continued)

FOREIGN PATENT DOCUMENTS

| CN | 1588358 A | 3/2005 |
| CN | 101008954 A | 8/2007 |
| CN | 101295315 A | 10/2008 |

OTHER PUBLICATIONS

Hayes, Jonathan, and Claudio Gutierrez. "Bipartite graphs as intermediate model for RDF." International Semantic Web Conference. Springer Berlin Heidelberg, 2004.*

(Continued)

*Primary Examiner* — Nan Hutton
(74) *Attorney, Agent, or Firm* — David M. Quinn; Otterstedt, Ellenbogen & Kammer, LLP

(57) ABSTRACT

Query requests for RDF triples are obtained, wherein the query request(s) contain(s) at least one triple pattern; for each triple pattern, the corresponding elementary pattern is determined, and each triple pattern is converted to a weighted elementary pattern. The occurrence frequency of each elementary pattern is computed based on the weighted elementary patterns; at least one elementary pattern is chosen at least according to the occurrence frequency; and the RDF triples corresponding to the chosen at least elementary pattern are prefetched into the buffer. The corresponding apparatus is also provided. With the above method and apparatus, the frequently accessed RDF triples can be determined and prefetched into the buffer, which improves the query efficiency.

4 Claims, 6 Drawing Sheets

(56) References Cited

U.S. PATENT DOCUMENTS

| | | | | |
|---|---|---|---|---|
| 2003/0212658 | A1* | 11/2003 | Ekhaus | G06F 17/30539 |
| 2004/0268085 | A1* | 12/2004 | Hara | G06F 9/3804 |
| | | | | 711/213 |
| 2008/0040308 | A1* | 2/2008 | Ranganathan | G06F 17/30595 |
| 2008/0243770 | A1 | 10/2008 | Aasman | |
| 2008/0256549 | A1* | 10/2008 | Liu | G06F 9/4881 |
| | | | | 718/106 |
| 2011/0099174 | A1* | 4/2011 | Chappell | G06F 17/30911 |
| | | | | 707/741 |
| 2012/0042395 | A1* | 2/2012 | Jain | G06F 21/6218 |
| | | | | 726/30 |

OTHER PUBLICATIONS

Schmidt, Michael, et al. "SP2Bench: a SPARQL performance benchmark."2009 IEEE 25th International Conference on Data Engineering. IEEE, 2009.*

Castillo, Roger, Christian Rothe, and Ulf Leser. RDFMatView: Idexing RDF Data for SPARQL Queries. Professoren des Inst. für Informatik, 2010.*

Stadler et al., Update Strategies for DBpedia Live, Leipzig U.,Proc. 6th Workshop Scripting Dev't. Crete, Greece, May 31, 2010. p. 1-10.

Luping Ding et al., Application-Specific Schema Design for Storing Large RDF Datasets, Hewlett Packard 2003.

Stuckenschmidt, Similarity-Based Query Caching, Vrije University Amsterdam,Proc. 6th Int'l Conf. Flexible Query Ansg. Sys. 2004 p. 1-12.

Battre, Efficient Query Processing in DHT-based RDF Stores, Technical University Berlin 2008.

Michael Martin et al., Improving the Performance of Semantic Web Applications with SPARQL Query Caching, ESWC'10 May 30, 2010 Proc. 7th Intl. Conf. Semantic Web p. 1-16.

Liarou, Erietta et al., "Continuous RDF Query Processing over DHTs," The Semantic Web, Springer Berlin Heidelberg. 2007. 324-339.

Caroll, Jeremy J. et al., "Jena:implementing the semantic web recommendations." Proc. 13th Int'l. World Wide Web Conf. Alt, Track papers & posters, ACM 2004.

\* cited by examiner

| subject | predicate | object |
|---|---|---|
| res1 | type | Researcher |
| res1 | name | B. C. Ooi |
| res1 | workAt | univ1 |
| univ1 | name | NUS |
| univ1 | locateAt | SIN |
| univ1 | type | University |
| pub1 | type | Article |
| pub1 | title | Main memory indexing |
| pub1 | year | 2004 |
| pub1 | author | res1 |
| pub1 | author | res2 |
| res2 | type | Researcher |
| res2 | name | Bin Cui |
| res2 | workAt | univ2 |
| univ2 | name | PKU |
| Article | type | Publication |
| Book | type | Publication |
| res3 | type | Researcher |
| res3 | name | Cui Yu |
| res1 | supervise | res3 |
| res3 | workAt | univ3 |
| univ3 | name | Monmouth Univ. |
| univ3 | locateAt | USA |
| univ3 | type | University |
| LNCS2341 | type | Book |
| LNCS2341 | title | High-dimensional Indexing |
| LNCS2341 | year | 2002 |
| LNCS2341 | editor | res4 |
| LNCS2341 | author | res3 |
| res4 | type | Researcher |
| res4 | type | Editor |
| res4 | name | G. Goos |
| res4 | workAt | univ4 |
| univ4 | name | Karlsruher Univ. |

FIG. 3A

| Statistic function | Value |
|---|---|
| DOM(type) | 10 |
| RNG(type) | 6 |
| FACT(type) | 11 |
| DOM(name) | 8 |
| RNG(name) | 8 |
| FACT(name) | 8 |
| DOM(author) | 2 |
| RNG(author) | 3 |
| FACT(author) | 3 |
| DOM(locateAt) | 2 |
| RNG(locateAt) | 2 |
| FACT(locateAt) | 2 |
| ...... | |

FIG. 3B

PREFETCHING RDF TRIPLE DATA

CROSS-REFERENCE TO RELATED APPLICATION(S)

This application is a continuation of U.S. patent application Ser. No. 13/305,116 filed Nov. 28, 2011, which claims foreign priority to P.R. China Patent application 201010577037.2 filed 29 Nov. 2010. The complete disclosures of U.S. patent application Ser. No. 13/305,116 and P.R. China Patent application 201010577037.2 are expressly incorporated herein by reference in their entireties for all purposes.

FIELD OF THE INVENTION

This invention relates to the storage and management of RDF triple data, and more particularly relates to a method and an apparatus for accelerating the query and read of RDF triple data.

BACKGROUND OF THE INVENTION

RDF (Resource Description Framework) is a technical standard of markup language published by W3C (World Wide Web Consortium) to better describe and express the contents and the structure of Web resources. Particularly, RDF can be specially used to express the metadata about Web resources, such as the title, the author, the update time of Web pages, the copyright and the license of Web documents, the available schedule of some shared resources, and so on. However, when "Web resources" are generalized, RDF can be used to describe the information of anything that can be identified on the Web. Along with the development of semantic-based web description, RDF data are used more and more widely in various Web related applications, so the management of RDF data becomes more and more important.

Different from general relational data, RDF data are expressed in triple form, including <subject, predicate, object>. That is, RDF describes the relation between elements using such triples. When these RDF triples are stored into a storage system such as a database, usually they can be queried using SPARQL recommended by W3C.

FIG. 1 illustrates the structure of the existing RDF data storage and query system. System 100 comprises a database 101, a data loader 102, a data access module 103 and a query engine 104. Database 101 is configured to store RDF triple data. Specifically, database 101 contains an IRI table and a triple table. The IRI table is used to store the correspondence relation between the internal ID or index and the IRI string in the data, while the triple table stores triple data with their internal ID representation. It is understood that such storage manner is advantageous for compressed data storage, which saves storage space. When new RDF data are inputted from outside, data loader 102 receives and parses the inputted RDF data and transforms it into internal data models. For each IRI string in the internal data models, data access module 103 assigns a unique internal ID for it, and inserts or stores the correspondence relation between the ID and the string in the above IRI table. Then, for each RDF triple in the data models, data access module 103 inserts or stores its internal ID representation into the above triple table. For the above stored RDF triple data, when the data are queried, query engine 104 receives the user's SPARQL request and translates it into the corresponding standard SQL (Structured Query Language) sentences. Data access module 103 retrieves the queried triples from database 101 according to SQL sentences, and returns the results to query engine 104.

The storage and query process of RDF data executed in the above system 100 will be described in detail in connection with specific examples. In one example, school course information is stored in database 101 in RDF triple form. Supposed that a user wants to know the name list of the students who elect Jack's course, then in query engine 104 the SPARQL query can be set as:

```
SELECT ?name
WHERE {
    ?student :hasName ?name.        (1)
    ?student :takeCourse ?course.   (2)
    ?course :toughtBy ?person.      (3)
    ?person :hasName "Jack".        (4)
}
```

In the above SPARQL query, all values of "name" are requested, wherein the sentences in WHERE{ } are the relations that the "name" should satisfy. Concretely, this query contains 4 triple-form sentences (1)-(4), each of which is called a triple pattern. It is understood that these sentences are numbered here for description convenience, and such numbers don't exist in the real query. Corresponding to RDF data, each triple pattern is also expressed in the form of <subject, predicate, object>, but question mark can be added before at least one element of the triple so as to set it as variable to be queried. For example, triple pattern (4) means that it is to query the variable person in the case that the corresponding predicate is hasName and the object is Jack in the triples; that is, the person whose name is Jack will be retrieved. Then, via triple pattern (3), subject course will be queried in the case that the corresponding predicate is toughtBy and the object is the above retrieved person; that is, the course taught by the person will be retrieved. In triple pattern (2), all students who elect the course will be queried, and finally in triple pattern (1), the names of the students are determined. Thus, via the above triple pattern (1)-(4), taking person, course and student as middle variables, the values of the queried name will be determined finally.

By executing the translated SQL query from the query engine 104, data access module 103 in FIG. 1 retrieves the query results accordingly from database 101 and returns them to query engine 104. In one example, the returned RDF triples are in the following form:

| Subject | Predicate | Object |
| --- | --- | --- |
| Course | toughtBy | person |
| Student | takeCourse | course |
| Person | hasName | "Jack" |
| Student | hasName | "Rose" |

Through the above triples, the result of the above-described query can be obtained; that is, the name of the student who elects Jack's course is Rose.

In the above query process, data access module 103 continually searches and retrieves data from database 101 according to the query of each triple pattern. However, because there is a large amount of data stored in database 101, the database is usually realized using large capacity storage media, such as a large capacity hard disk. Thus, continually searching and retrieving data from the hard disk brings a high IO cost and further influences the query efficiency and system performance.

To improve query efficiency, one solution adopted in the database system is to prefetch a part of the data in the buffer which is easy to access, for example the memory or the cache of a computing system. Therefore, when the computing system queries or accesses this part of the data, it can read data directly from the buffer, thereby reducing IO cost. However, because the buffer size is usually very limited, which data should be prefetched into the buffer in order to optimize the query efficiency is an issue under investigation. For the general relational data, various methods have been proposed for prefetching a part of data in the existing techniques. However, because of the special format of RDF data, the existing techniques are not adapted to optimize RDF data query. Therefore, a method and an apparatus are needed for selectively prefetching a part of RDF data to the buffer so as to accelerate and optimize RDF data query.

SUMMARY OF THE INVENTION

In view of the above-mentioned problems, embodiments of the invention are provided to improve the query efficiency of RDF data.

According to a first aspect of the invention, a method for prefetching RDF triples from RDF triple data storage system is provided, wherein each RDF triple contains subject, predicate and object, the method comprises: obtaining the query requests for RDF triples, wherein the query requests contain at least one triple pattern; converting the at least one triple pattern to a weighted elementary pattern; computing the occurrence frequency of the elementary patterns based on the weighted elementary patterns; and prefetching the RDF triples corresponding to the elementary patterns into the buffer when the occurrence frequency of the elementary patterns meets certain condition(s).

According to a second aspect of the invention, an apparatus for prefetching RDF triples from RDF triple data storage system is provided, wherein each RDF triple contains subject, predicate and object, the apparatus comprises: a query obtaining unit, configured to obtain the query requests for RDF triples, wherein the query requests contain at least one triple pattern; a pattern analyzing unit, configured to convert the at least one triple pattern to a weighted elementary pattern; a frequency computing unit, configured to compute the occurrence frequency of the elementary patterns based on the weighted elementary patterns; and a data prefetching unit, configured to prefetch the RDF triples corresponding to the elementary patterns into the buffer when the occurrence frequency of the elementary patterns meets certain condition(s).

With the method and the apparatus of one or more embodiments of the invention, the query patterns with higher occurrence frequency can be determined, thereby the RDF triples with higher access frequency can be determined, and these triples can be prefetched into the easy-to-access buffer. Then, in the later queries, the frequently accessed RDF data can be read directly from the buffer, which can reduce IO cost and improve query efficiency.

BRIEF DESCRIPTION OF THE DRAWINGS

FIG. 3A illustrates some exemplary RDF triples stored in an RDF database;

FIG. 3B illustrates some statistical results of the data shown in FIG. 3A;

DETAILED DESCRIPTION OF PREFERRED EMBODIMENTS

The following is the description of the embodiments in connection with the drawings. It is understood that the detailed description is illustrative, rather than restrictive, to the scope of the present invention.

Figure 2:
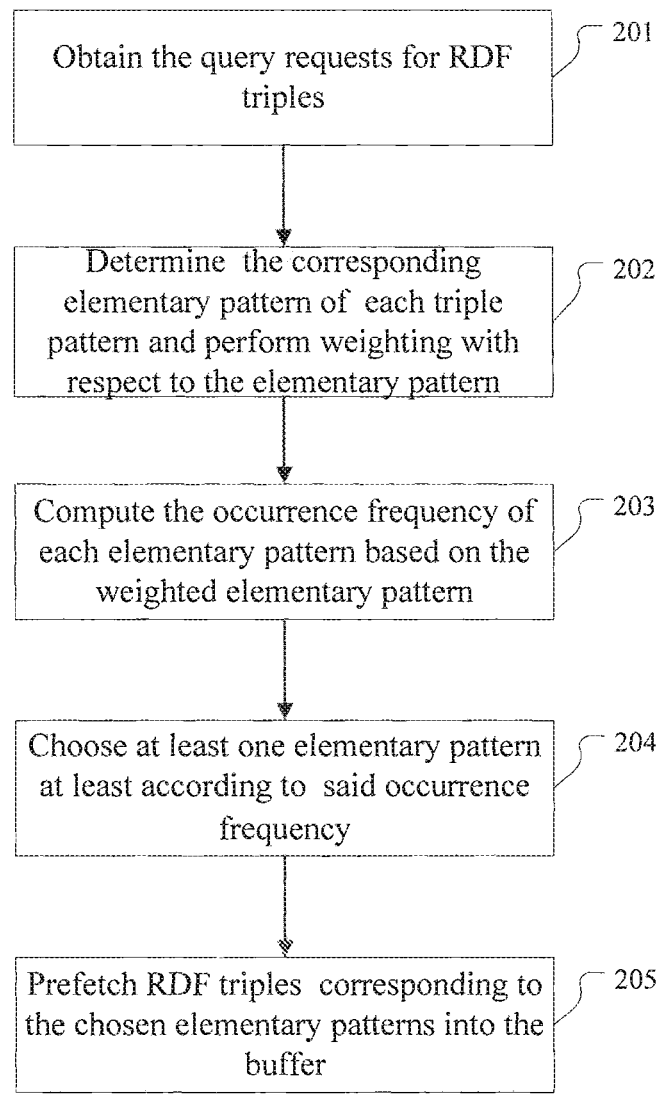
FIG. 2 is a flowchart of the method according to one embodiment of the invention.

FIG. 2 is a flowchart of the method according to one embodiment of the invention, wherein the method is used to prefetch a part of the RDF triples stored in a RDF data storage system to the buffer. Specifically, the method comprises step 201, obtaining the query requests for RDF triples, wherein the query requests contain at least one triple pattern; step 202, for each of the obtained at least one triple pattern, determining the corresponding elementary pattern and performing weighting with respect to the corresponding elementary pattern; step 203, computing the occurrence frequency of each elementary pattern based on the weighted elementary patterns; step 204, choosing at least one elementary pattern at least according to the occurrence frequency; and step 205, prefetching the RDF triples corresponding to the chosen at least one elementary pattern into the buffer. Through the above steps, the most frequently queried and accessed RDF triples can be determined and thus prefetched into the buffer in one or more embodiments of the invention, which improves the query efficiency.

The following is the description of the above steps shown in FIG. 2 in connection with the specific examples.

At step 201, the query requests for RDF triples are obtained. In one embodiment, those query requests are obtained in real time from the query engine. In another embodiment, the records of those query requests are read from the system query log. Optionally, a plurality of query requests, i.e. a query set, can be obtained at one time. Typically, the search and query requests for RDF data are SPARQL queries, each of which contains at least one triple pattern, such as triple patterns (1)~(4) shown in the prior art.

Then, at step 202, the obtained triple patterns are analyzed and converted. Firstly, for each triple pattern, the corresponding elementary pattern is determined. The elementary pattern is defined mainly according to the data feature in the RDF triple data storage system and the request feature of the data query. In one embodiment, the elementary pattern is defined as the triple pattern in which only the predicate is constant; that is, the triple pattern in the form of <?subject, predicate, ?object>. If s denotes the subject, p donates the predicate, o donates the object, prefix '?' denotes a query variable, prefix ':' donates a constant, then the elementary pattern can be represented as <?s :p ?o>. It is understood that the elementary pattern can be defined in other forms, for example, the triple pattern in <:s ?p ?o> form in which only the subject is constant, the triple pattern in <?s ?p :o> form in which only the object is constant, the triple pattern in <:s :p ?o> form with constant subject and constant predicate, etc. Following is the description of the embodiments in connection with elementary patterns in <?s :p ?o> form. Those skilled in the art can understand that the embodiments of this invention are also applicable for other elementary patterns.

The strength of defining elementary patterns as <?s :p ?o> and classifying the triple patterns and the triple data based on the predicate is that the number of different predicates of RDF triples stored in the RDF database is much less than the number of RDF triples themselves. For example, in the RDF dataset of Wikipedia, the number of RDF triples is about 136.9 million, but the number of the referred predicates is only 927. What is more, in all possible triple patterns, triple patterns with constant predicate <?s :p :o>, <?s :p ?o> and <:s :p ?o> are the most common triple patterns, while triple patterns <?s ?p :o>, <:s ?p :o> and <:s ?p ?o> with querying predicates are seldom used, and <?s ?p ?o> of querying all elements is needless to say. Currently, the triple patterns contained in the standard test set of SPARQL are mostly the above most common triple patterns with constant predicate.

For the above-mentioned common triple pattern <?s :p :o>, <?s :p ?o> and <:s :p ?o>, it can be seen that <?s :p ?o> itself is an elementary pattern, while <?s :p :o> and <:s :p ?o> only query the subject or the object, the query results of which must be the subset of the query results of elementary pattern <?s :p ?o> with the same predicate. Therefore, each triple pattern whose predicate is a constant, contained in SPARQL queries can be mapped to an elementary pattern defined above. Accordingly, the step of determining the elementary pattern corresponding to a triple pattern is to determine the elementary pattern having the same predicate with that of the triple pattern.

In the illustrated triple patterns (1)~(4), triple patterns (1)~(3) are all triple patterns that have a constant predicate and query the subject and the object, i.e. elementary patterns. In triple pattern (4), object 'Jack' is also a constant besides constant predicate 'hasName', so it is not an elementary pattern. Then, it can be determined that the corresponding elementary pattern is elementary pattern <?s :hasName ?o> with the same predicate.

After the corresponding elementary pattern of each triple pattern is determined, the triple pattern is weighted with respect to the corresponding elementary pattern in terms of occurrence frequency, so as to convert it to the weighted elementary pattern. That is because an elementary pattern only defines the predicate, the query results include all triples with the specified predicate, or, in other words, the complete set of the specified predicate. Therefore, the query of an elementary pattern will result in the accessing and the retrieving of the complete set of the specified predicate, while in the triple patterns that are not elementary patterns, the subject or the object is also defined and the query results are a part of the complete set of the specified predicate. That is, the triple pattern whose predicate is a constant but not elementary pattern, only access a part of the data accessed by its corresponding elementary pattern. Then, to evaluate the contribution of each triple pattern to the accessing frequency on the triple data, the non-elementary patterns should be discounted with respect to elementary patterns in terms of occurrence times; that is, they should be weighted.

In one embodiment, it is simply defined that the weight of non-elementary patterns is 0.5 compared with corresponding elementary patterns. Then, triple patterns (1)~(4) can be converted as:

| | | |
|---|---|---|
| <?s :has Name ?o> | (1') |
| <?s :take Course ?o> | (2') |
| <?s :toughtBy ?o> | (3') |
| <?s :hasName ?o>*0.5 | (4') |

In some embodiments, the triple patterns are weighted by referring to the statistical information of the RDF database.

Specifically, in one embodiment, for triple pattern <?s :p :o>, Num (p, o) is defined as the number of triples in the RDF database with predicate p and object o, and FACT (p) is defined as the number of all triples with predicate p, i.e., the number of different <s,o> pairs. Then, the weight w (p, o) of triple pattern <?s :p :o> can be defined as:

w(p,o)=Num(p,o)/FACT(p)

Accordingly, for triple pattern <:s :p ?o>, Num (s, p) is defined as the number of triples in the RDF database with predicate p and subject s, and the weight w (s, p) of triple pattern <:s :p ?o> can be defined as:

w(s,p)=Num(s,p)/FACT(p)

For triple pattern <?s :p ?o>, since it is an elementary pattern, its weight is set as 1. Thereby, those three triple patterns contained in the SPARQL queries have been weighted.

In other embodiments, more statistical information of the RDF database can be considered. In one embodiment, Domain statistics and Range statistics of the triples in the RDF database are defined, wherein Domain statistics are used to compute the subject number and Range statistics are used to compute the object number.

Specifically, function DOM (p) is defined to denote the number of different subjects s with constant predicate p (the object can be any) in the RDF database; function DOM (o) is defined to denote the number of different subjects s with constant object o (the predicate can be any) in the RDF database.

Function RNG(s) is defined to denote the number of different objects o with constant subject s (the predicate can be any) in the RDF database; RNG(p) is defined to denote the number of different objects o with constant predicate p (the subject can be any) in the RDF database.

Furthermore, FACT (p) defined in the above embodiment is used to denote the number of different triples with predicate p, i.e., the number of different <s,o> pairs.

Based on the above statistics, the weight w (p, o) of triple pattern <?s :p :o> can be defined as:

$$w(p, o) = \frac{MIN(DOM(p), DOM(o))}{FACT(p)} \quad (i)$$

For triple pattern <:s :p ?o>, its weight w(s,p) can be defined as:

$$w(s, p) = \frac{MIN(RNG(s), RNG(p))}{FACT(p)} \quad (ii)$$

In the same way, for elementary pattern <?s :p ?o>, its weight is set as 1.

In connection with one example, following is the description of the process of weighting and converting triple patterns according to the above-mentioned embodiment. FIG. 3A illustrates some exemplary RDF triples stored in an RDF database, and FIG. 3B illustrates some statistical results of the data shown in FIG. 3A. In the triples shown in FIG. 3A, taking predicate "type" as an example, it can be seen that the number of different subjects with predicate "type" is 10, i.e. DOM (type)=10; the number of different objects with predicate "type" is 6, i.e. RNG (type)=6; and the number of the triples with predicate "type" is 11, i.e.

FACT (type)=11. Other predicates and functions can be analyzed similarly and thus the statistic results shown in FIG. 3B can be obtained. These statistical results, as assistant storage information for further use, can be pre-stored in certain areas of the database and updated periodically, or updated when new data are received in the database.

Suppose the first SPARQL query for the data in FIG. 3A is defined as:

```
SELECT ?publication
WHERE
{?publication type Article              (11)
 ?publication author ?researcher        (12)
 ?researcher workAt ?university         (13)
 ?university name NUS}                  (14)
```

Wherein triple patterns (12) and (13) are elementary patterns whose weight is 1; the corresponding elementary pattern of triple pattern (11) is <?s type ?o>, and the corresponding elementary pattern of triple pattern (14) is <?s name ?o>. Substituting the statistical results in FIG. 3B into formulas (i) and (ii), it can be obtained that the weights of triple pattern (11) and (14) are 1/11 and 1/8 respectively. Therefore, the first query can be converted into:

```
<?s type ?o>* 1/11    (11')
<?s author ?o>        (12')
<?s workAt ?o>        (13')
<?s name ?o>* 1/8     (14')
```

Similarly, suppose the second SPARQL query is:

```
SELECT ?publication
WHERE
{ ?researcher supervise ?student       (21)
  ?researcher name "Ooi Beng Chin"     (22)
  ?publication author ?student}        (23)
```

According to the above process, the second query can be converted into:

```
<?s supervise ?o>      (21')
<?s name ?o>*1/8       (22')
<?s author ?o>         (23')
```

Although some statistical methods and weighting methods are illustrated in the above embodiments, it is understood that those skilled in the art can modify the above methods or use other methods after reading this description. Any method for weighting the triple patterns, as long as it can reflect the effect of triple patterns on the access frequency of triples in the database in some aspect or in some degree, can be adopted for embodiments of the invention.

Moreover, the above embodiments are all described in connection with elementary patterns in the form of <?s :p ?o>. For other forms of elementary patterns, the corresponding weighting method can be adopted according to need to convert triple patterns to weighted elementary patterns, in order to reflect the effect of the triple patterns on triple data access frequency.

After weighting and converting the triple patterns in the queries, step 203 in FIG. 2 computes the occurrence frequency of each elementary pattern based on the weighted elementary patterns.

For example, in the above first query and the second query, for each of the weighted elementary patterns (11')~(14') and (21')~(23'), by summing up the weight factor of the same elementary pattern, the occurrence frequency of each elementary pattern can be obtained. Specifically, the occurrence frequency of <?s type ?o> is 1/11, the occurrence frequency of <?s author ?o> is 2, the occurrence frequency of <?s workAt ?o> is 1, the occurrence frequency of <?s name ?o> is 1/4, and the occurrence frequency of <?s supervise ?o> is 1.

In one embodiment, for a plurality of queries, firstly the occurrence frequency of each query is computed, and then the occurrence frequencies of the elementary patterns involved in the queries are computed based on the occurrence frequency of each query. For example, in a specific example, a query set Q is obtained, which contains a plurality of different queries, i.e. $Q=\{q_1, q_2, \ldots q_m\}$. Suppose the occurrence frequency of a query $q_i$ is $f(q_i)$. For each query $q_i$ appearing, the corresponding elementary pattern p and the corresponding weight $w_{p,q_i}$ can be determined as mentioned above. Then, the occurrence frequency of elementary pattern p involved in query $q_i$ can be represented as $f(q_i) \times w_{p,q_i}$. For the above set Q, the occurrence frequency $f(p)$ of elementary pattern p can be represented as:

$$f(p) = \Sigma_{q_i \in Q'} f(q_i) \times w_{p,q_i}$$

wherein Q' denotes the set of queries involving elementary pattern p.

Thereby, the occurrence frequency of each elementary pattern can be determined.

Based on the above computed occurrence frequency, at least one elementary pattern is chosen at step 204, and at step 205, RDF triples corresponding to the at least one elementary pattern are prefetched into the buffer. Generally, the above chosen elementary patterns are the elementary patterns with higher occurrence frequency. Since these elementary patterns have higher occurrence frequency in the queries, accordingly, their corresponding RDF triples have higher access frequency in the RDF database, and thus, prefetching these RDF triples into the buffer will facilitate the query speed.

In one embodiment, the obtained occurrence frequency of each elementary pattern simply chosen from the order. The RDF triples corresponding to the chosen elementary patterns are prefetched into the buffer.

In some embodiments, the capacity limit and the utilization ratio of the buffer are also taken into consideration. That is, it is expected that the RDF triples corresponding to elementary patterns with higher occurrence frequency are chosen while the total size of these triples does not exceed the buffer size and at the same time the benefit of the buffer is optimized. The optimized benefit of the buffer means that the triples stored in the buffer are as many as possible and the access frequency of these triples is as high as possible, etc.

This target can be generalized as the constrained optimization problem in mathematics. If M is the buffer size, $size(p_i)$ is the size of the triples in the RDF database corresponding to elementary pattern $p_i$, and $a_i$ is the choosing factor of elementary pattern $p_i$, i.e. $a_i$ is 0 or 1, then for n elementary patterns, they should meet the constraint:

$$\sum_{i=1}^{n} a_i \times size(p_i) \leq M \qquad \text{(iii)}$$

Meanwhile, the benefit function is defined as:

$$B = \sum_{i=1}^{n} a_i \times \text{size}(p_i) \times f(p_i).$$

Thus, the above problem can be represented as how to determine the value of $a_i$ in order to make the largest benefit function B and meet constraint (iii) at the same time.

One common method for solving the above optimization problem is firstly ordering the elementary patterns in a queue according to their occurrence frequency from high to low. For the elementary pattern with the highest occurrence frequency in the queue, suppose its choosing factor is 1, then it is judged whether the constraint (iii) is met or not. If the constraint is met, then the choosing factor is set as 1; that is, the elementary pattern is chosen and the next elementary pattern in the queue is judged continually. For a certain elementary pattern in the queue, if it does not meet constraint (iii), then the elementary pattern is ignore; that is, its choosing factor is set as 0, and the next elementary pattern in the queue is judged continually until the whole queue is checked.

For the above constrained optimization problem, various approaches have been proposed in the existing technique to obtain optimized solutions, which is needless to describe. It is understood, those skilled in the art can adopt a proper approach to choose elementary patterns according to needs in order to optimize the benefit of the buffer.

As described above, by determining the occurrence frequency of each elementary pattern involved in SPARQL queries, and prefetching the corresponding triples of some elementary patterns into the buffer according to the occurrence frequency of these elementary patterns, the frequently accessed data in the RDF database can be pre-stored in advance. Thus, the later queries may read the data directly from the buffer with great possibility, which reduces IO cost and improves the query efficiency of RDF triples.

Figure 1:
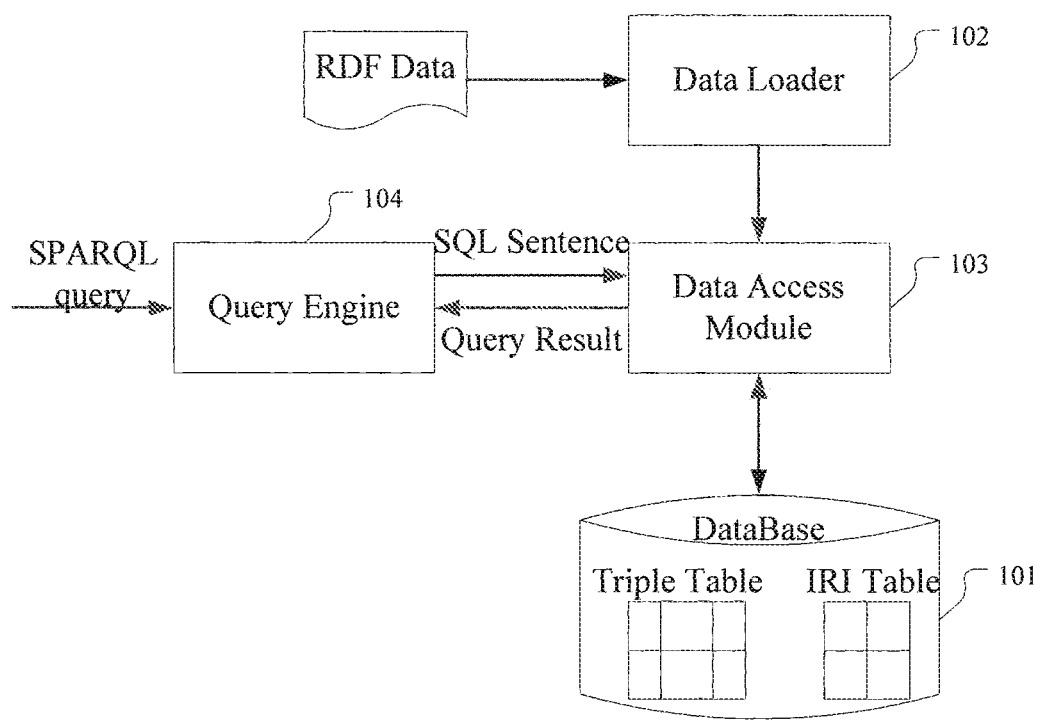
FIG. 1 illustrates the structure of an existing RDF data storage and query system.

Based on the same inventive conception, this invention also provides an apparatus for prefetching RDF triple data. Advantageously, it is expected that this apparatus is constructed based on the existing RDF data storage and query system shown in FIG. 1 as much as possible, with the existing architecture modified as little as possible. Therefore, one or more embodiments of the invention proposes to add a prefetching apparatus to the existing RDF data storage and query system, in order to analyze and choose the triples with higher access frequency and prefetch them into the buffer.

Figure 4:
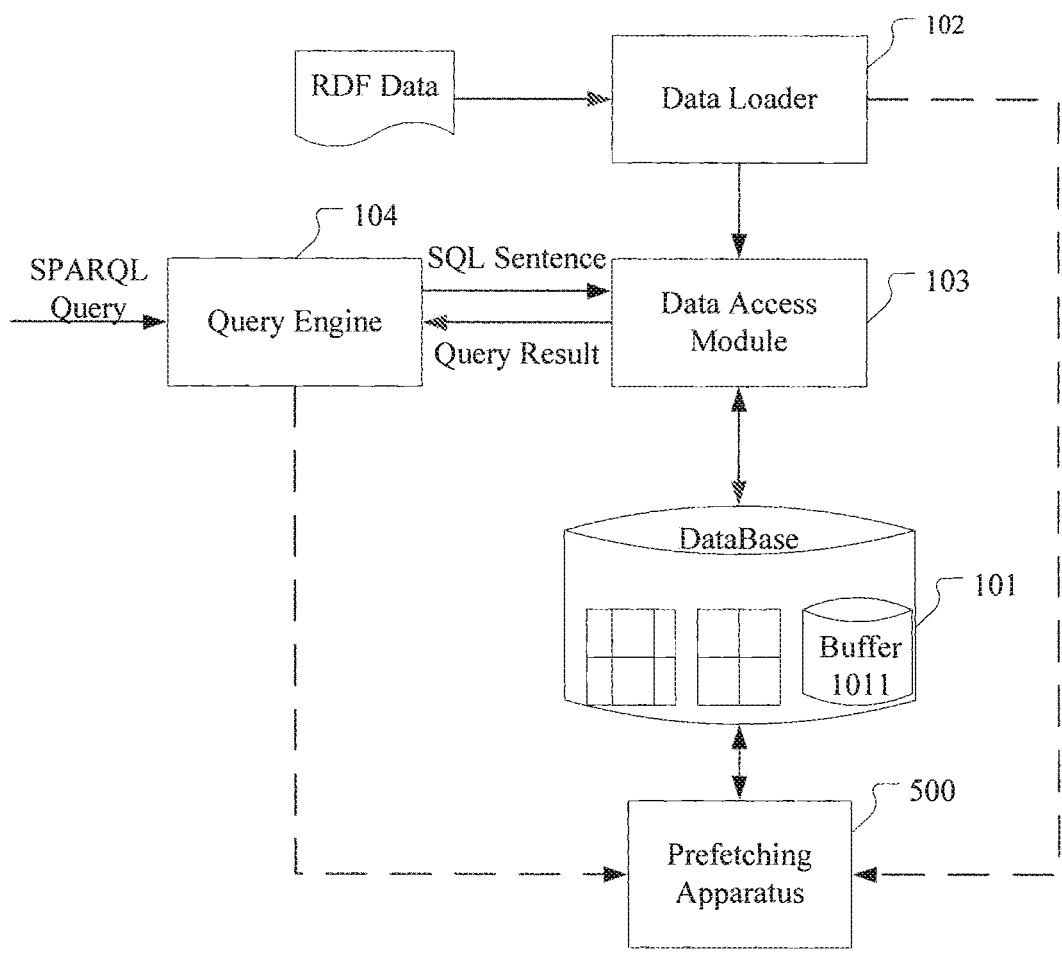
FIG. 4 illustrates the RDF data storage and query system comprising a prefetching apparatus according to one embodiment of the invention.

Specifically, FIG. 4 illustrates an RDF data storage and query system comprising the prefetching apparatus according to one embodiment of the invention. Compared with the system in FIG. 1, the system in FIG. 4 additionally comprises a prefetching apparatus 500, which communicates with database 101, in order to prefetch the frequently queried triples into buffer 1011. Optionally, the prefetching apparatus 500 also connects with data loader 102 and/or query engine 104 in order to obtain the information about data storage and query.

Figure 5:
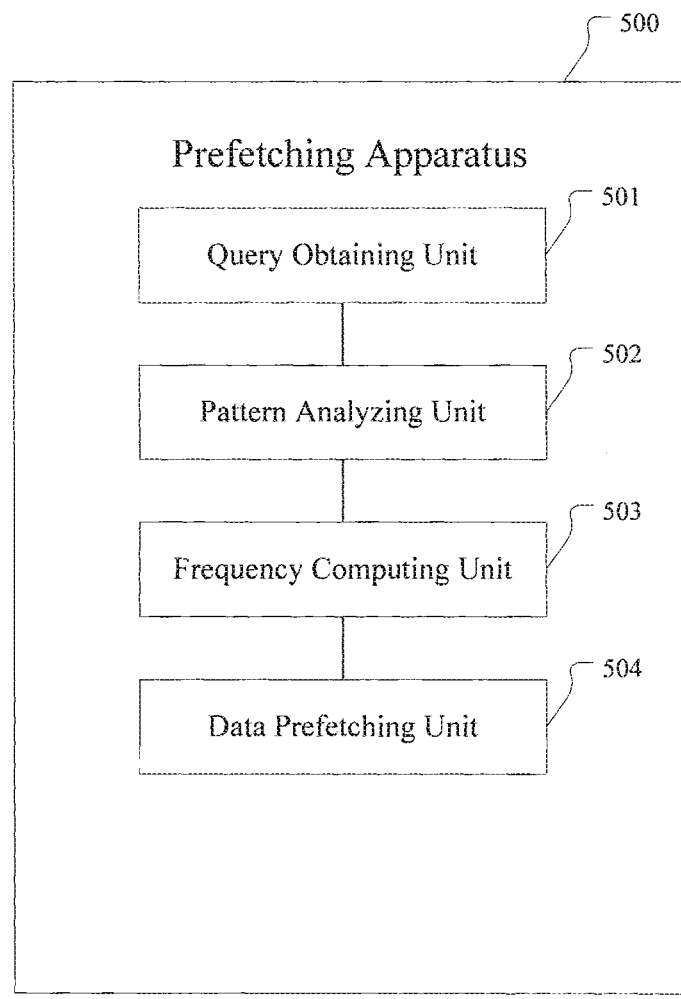
FIG. 5 is a block diagram of the prefetching apparatus according to one embodiment of the invention.

FIG. 5 is a block diagram of the prefetching apparatus according to one embodiment of the invention. As shown in the figure, the prefetching apparatus 500 comprises a query obtaining unit 501, configured to obtain the query requests for RDF triples, wherein the query requests contain at least one triple pattern; a pattern analyzing unit 502, configured to, for each of the obtained at least one triple pattern, determine the corresponding elementary pattern and perform weighting with respect to the corresponding elementary pattern; a frequency computing unit 503, configured to compute the occurrence frequency of each elementary pattern based on the weighted elementary patterns; and a data prefetching unit 504, configured to choose at least one elementary pattern at least according to the occurrence frequency, and prefetch the RDF triples corresponding to the chosen at least one elementary pattern into the buffer.

Specifically, the query obtaining unit 501 obtains the query requests for RDF triples. In one embodiment, the query obtaining unit 501 connects with query engine 104, to acquire the query requests in real time. In another embodiment, the query obtaining unit 501 reads the query records from the system log. Optionally, multiple query requests, i.e. a query set, can be obtained at one time. For SPARQL queries for RDF data, each query contains at least one triple pattern. The query obtaining unit 501 sends the obtained queries and the contained triple patterns to pattern analyzing unit 502.

Pattern analyzing unit 502 analyzes and converts the received triple patterns. Firstly, for each triple pattern, pattern analyzing unit 502 determines the corresponding elementary pattern; that is, determines the elementary pattern <?s :p ?o> having the same predicate with the triple pattern.

After determining the corresponding elementary pattern of each triple pattern, pattern analyzing unit 502 weights the triple pattern with respect to the corresponding elementary pattern in terms of occurrence times and thus converts triple patterns to weighted elementary patterns.

In one embodiment, pattern analyzing unit 502 simply sets the weight of non-elementary patterns compared with the elementary patterns as a fixed value, for example 0.5. In other embodiments, pattern analyzing unit 502 further connects with database 101 and/or data loader 102, in order to weight triple patterns by referring to the statistical information in the RDF database.

Specifically, in one embodiment, pattern analyzing unit 502 computes the weight of triple pattern <?s :p :o> using the formula w(p,o)=Num(p,o)/FACT(p), and computes the weight of triple pattern <:s :p ?o> using formula w(s,p)=Num(s,p)/FACT(p), wherein Num (p, o) denotes the number of different triples with predicate p and object o in RDF database; Num (s, p) denotes the number of different triples with predicate p and subject s in RDF database; FACT (p) denotes the number of all triples with predicate p. For elementary pattern <?s :p ?o>, pattern analyzing unit 502 sets its weight as 1.

In other embodiments, pattern analyzing unit 502 further considers more statistical information of the RDF database. In one example, pattern analyzing unit 502 considers Domain statistics and Range statistics of triple data in the RDF database. Specifically, pattern analyzing unit 502 computes the weight w (p, o) of triple pattern <?s :p :o> using formula (i) and computes the weight w (s, p) of triple pattern <:s :p ?o> using formula (ii):

$$w(p, o) = \frac{\text{MIN}(DOM(p), DOM(o))}{\text{FACT}(p)} \quad \text{(i)}$$

$$w(s, p) = \frac{\text{MIN}(RNG(s), RNG(p))}{\text{FACT}(p)} \quad \text{(ii)}$$

Wherein function DOM (p) denotes the number of different subjects s with predicate p (the object can be any) in the RDF database; function DOM (o) denotes the number of different subjects s with object o (the predicate can be any) in the RDF database. Function RNG(s) denotes the number of different object o with subject s (the predicate can be any) in the RDF database; RNG(p) denotes the number of different objects o with predicate p (the subject can be any) in the RDF database. FACT (p) has the same meaning with the above embodiment. Similarly, for elementary pattern <?s :p ?o>, its weight is set as 1.

Although some statistical methods and weighting methods are illustrated for pattern analyzing unit 502, it is understood that those skilled in the art can optionally use other methods as long as the weight can reflect the effect of triple patterns on the access frequency of triples in the database in some aspect or in some degree.

After pattern analyzing unit 502 weights and converts the triple patterns in the query requests, frequency computing unit 503 computes the occurrence frequency of each elementary pattern based on the weighted elementary patterns.

In one example, frequency computing unit 503 considers the weighted elementary patterns involved in each query one by one, and obtains the occurrence frequency of each elementary pattern by summing up the weighting factor of the same elementary pattern.

In one embodiment, when query obtaining unit 501 obtains multiple queries, it firstly computes the occurrence frequency of each query. Then frequency computing unit 503 can compute the occurrence frequencies of the elementary patterns involved in the queries based on the occurrence frequency of each query.

Then frequency computing unit 503 sends the computed occurrence frequency of each elementary pattern to data prefetching unit 504. Data prefetching unit 504 chooses at least one elementary pattern based on the received occurrence frequency, and prefetches the RDF triples corresponding to the chosen at least one elementary pattern into the buffer.

In one embodiment, data prefetching unit 504 orders the received occurrence frequency of each elementary pattern, and simply chooses several elementary patterns with the highest occurrence frequency from the order. Then data prefetching unit 504 prefetches the corresponding RDF triples of the chosen elementary patterns into the buffer In some embodiments, data prefetching unit 504 also considers the size limit and the utilization ratio of the buffer. That is, data prefetching unit 504 chooses the elementary patterns, such that the size of the triples to be prefetched does not exceed the buffer size and the benefit of the buffer is optimized. The optimized benefit of the buffer means that the triples stored in the buffer are as many as possible and the access frequency of these triples is as high as possible, etc.

To achieve the above optimization target, in one embodiment, data prefetching unit 504 firstly orders the elementary patterns in a queue according to their occurrence frequency from high to low. For the elementary pattern with the highest occurrence frequency in the queue, it is judged whether the constraint on the buffer size would be met if this elementary pattern is chosen. If the constraint is met, it is determined to choose the elementary pattern and to judge the next elementary pattern in the queue continually. For a certain elementary pattern in the queue, if the buffer size constraint is not met, then the elementary pattern is ignored and the next elementary pattern in the queue is judged continually until the whole queue is checked.

For the above constrained optimization problem, various approaches have been proposed in the existing technique(s) to obtain the optimized solutions. Data prefetching unit 504 can adopt other proper approaches to choose elementary patterns in order to optimize the benefit of the buffer.

Thereby, the prefetching apparatus 500 can determine the occurrence frequency of each elementary pattern involved in SPARQL queries and prefetch the corresponding triples of some elementary patterns into buffer 1011 according to the occurrence frequency of elementary patterns. Thus, the frequently accessed data in the RDF database can be prefetched, which improves the subsequent query efficiency. The detailed embodiments are accordant with those of the above prefetching method, which is needless to describe again.

Through the above description of the embodiments, those skilled in the art will recognize that the above method and apparatus for prefetching RDF triple data can be practiced by executable instructions and/or controlling codes in the processors e.g. codes in mediums like disc, CD or DVD-ROM; memories like ROM or EPROM; and carriers like optical or electronic signal carrier. The apparatus and its units can be realized using hardware like VLSI or Gates and Arrays, like semiconductors e.g. Logic Chip, transistors, etc., or like programmable hardware equipment e.g. FPGA, programmable logic equipment, etc.; or using software executed by different kinds of processors; or using the combination of the hardware and software. The software and program codes for implementing the invention can be written using object-oriented languages like Java, Smalltalk, C++, etc., and the traditional procedural languages like C language or other similar languages. The source code can be executed locally or remotely.

Thus, having reviewed the disclosure herein, the skilled artisan will appreciate that aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Distinct software modules for carrying aspects of embodiments of the invention can be, in at least some cases, embodied on a computer readable storage medium. The distinct software modules may include, for example, any one, some, or all of the modules and/or sub-modules in FIGS. 4 and 5, for example.

The means mentioned herein can include (i) hardware module(s), (ii) software module(s) executing on one or more hardware processors, or (iii) a combination of hardware and software modules; any of (i)-(iii) implement the specific techniques set forth herein, and the software modules are stored in a computer readable medium (or multiple such media).

The above-described exemplary embodiments are intended to be illustrative in all respects of the method and apparatus for prefetching RDF triple data, rather than restrictive, of the present invention. Those skilled in the art should recognize that the present invention is capable of many variations and modifications within the scope and spirit of the present invention. The scope of the present invention is defined only by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for processing Resource Description Framework triples, comprising:
    obtaining query requests for Resource Description Framework triples, wherein said query requests each contain at least one triple pattern;
    determining elementary patterns corresponding to said triple patterns;
    performing weighting with respect to said corresponding elementary patterns to weighted elementary patterns;
    computing occurrence frequency of said elementary patterns based on the weighted elementary patterns; and
    prefetching those of the Resource Description Framework triples corresponding to said elementary patterns into a buffer if the occurrence frequency of said elementary patterns meets at least one predetermined condition;
    wherein said weighting comprises determining weight of said at least one triple pattern with respect to a corresponding one of said elementary patterns by referring to statistical information in an Resource Description Framework triple data storage system; and
    wherein said weighting comprises:
    setting the weight w (p, o) of triple patterns in <?s :p :o> form with respect to elementary patterns in <?s :p ?o> form as: $w(p,o) = Num(p,o)/FACT(p)$,
    setting the weight w (s, p) of triple patterns in <:s :p ?o> form with respect to elementary patterns in <?s :p ?o> form as: $w(s,p) = Num(s,p)/FACT(p)$,
    wherein Num(p,o) denotes the number of all triples with predicate p and object o, Num(s,p) denotes the number of all triples with predicate p and subject s, FACT(p) denotes the number of all triples with predicate p in said Resource Description Framework triple data storage system.

2. A method for processing Resource Description Framework triples, comprising:
    obtaining query requests for Resource Description Framework triples, wherein said query requests each contain at least one triple pattern;
    determining elementary patterns corresponding to said triple patterns;
    performing weighting with respect to said corresponding elementary patterns to weighted elementary patterns;
    computing occurrence frequency of said elementary patterns based on the weighted elementary patterns; and
    prefetching those of the Resource Description Framework triples corresponding to said elementary patterns into a buffer if the occurrence frequency of said elementary patterns meets at least one predetermined condition;
    wherein said weighting comprises determining weight of said at least one triple pattern with respect to a corresponding one of said elementary patterns by referring to statistical information in an Resource Description Framework triple data storage system; and
    wherein said weighting comprises:
    setting the weight w (p, o) of triple patterns in <?s :p :o> form with respect to elementary patterns in <?s :p ?o> form as:

$$w(p, o) = \frac{MIN(DOM(p), DOM(o))}{FACT(p)}$$

setting the weight w (s, p) of triple patterns in <:s :p ?o> form with respect to elementary patterns in <?s :p ?o> form as:

$$w(s, p) = \frac{MIN(RNG(s), RNG(p))}{FACT(p)}$$

wherein DOM (p) denotes the number of different subjects with predicate p;
    DOM (o) denotes the number of different subjects with object o;
    RNG(s) denotes the number of different objects with subject s;

RNG(p) denotes the number of different objects with predicate p; and FACT (p) denotes the number of all triples with predicate p in said Resource Description Framework triple data storage system.

3. An apparatus for processing Resource Description Framework triples, comprising:
a query obtaining unit, configured to obtain the query requests for Resource Description Framework triples, wherein said query requests contain at least one triple pattern;
a pattern analyzing unit, configured to convert said at least one triple pattern to a weighted elementary pattern;
a frequency computing unit, configured to compute the occurrence frequency of said elementary patterns based on the weighted elementary patterns; and
a data prefetching unit, configured to prefetch the Resource Description Framework triples corresponding to said elementary patterns into the buffer if the occurrence frequency of said elementary patterns meets certain condition;
wherein each of said query obtaining unit, said pattern analyzing unit, said frequency computing unit, and said data prefetching unit comprises at least one of:
dedicated hardware; and
software tangibly embodied in a non-transitory storage medium, loaded into a hardware memory, and executing on at least one hardware processor coupled to the memory;
wherein said pattern analyzing unit is configured to, determine the weight of said at least one triple pattern with respect to a corresponding one of said elementary patterns by referring to the statistical information in an Resource Description Framework triple data storage system; and
wherein said pattern analyzing unit is configured to:
set the weight w (p, o) of triple patterns in <?s :p :o> form with respect to elementary patterns in <?s :p ?o> form as: w(p,o)=Num(p,o)/FACT(p), and
set the weight w (s, p) of triple patterns in <:s :p ?o> form with respect to elementary patterns in <?s :p ?o> form as: w(s,p)=Num(s,p)/FACT(p),
wherein Num(p,o) denotes the number of all triples with predicate p and object o, Num(s,p) denotes the number of all triples with predicate p and subject s, FACT(p) denotes the number of all triples with predicate p in said Resource Description Framework triple data storage system.

4. An apparatus for processing Resource Description Framework triples, comprising:
a query obtaining unit, configured to obtain the query requests for Resource Description Framework triples, wherein said query requests contain at least one triple pattern;
a pattern analyzing unit, configured to convert said at least one triple pattern to a weighted elementary pattern;
a frequency computing unit, configured to compute the occurrence frequency of said elementary patterns based on the weighted elementary patterns; and
a data prefetching unit, configured to prefetch the Resource Description Framework triples corresponding to said elementary patterns into the buffer if the occurrence frequency of said elementary patterns meets certain condition;
wherein each of said query obtaining unit, said pattern analyzing unit, said frequency computing unit, and said data prefetching unit comprises at least one of:
dedicated hardware; and
software tangibly embodied in a non-transitory storage medium, loaded into a hardware memory, and executing on at least one hardware processor coupled to the memory;
wherein said pattern analyzing unit is configured to, determine the weight of said at least one triple pattern with respect to a corresponding one of said elementary patterns by referring to the statistical information in an Resource Description Framework triple data storage system; and
wherein said pattern analyzing unit is configured to:
set the weight w (p, o) of triple patterns in <?s :p :o> form with respect to elementary patterns in <?s :p ?o> form as:

$$w(p, o) = \frac{MIN(DOM(p), DOM(o))}{FACT(p)}$$

set the weight w (s, p) of triple patterns in <:s :p ?o> form with respect to elementary patterns in <?s :p ?o> form as:

$$w(s, p) = \frac{MIN(RNG(s), RNG(p))}{FACT(p)}$$

wherein DOM (p) denotes the number of different subjects with predicate p;
DOM (o) denotes the number of different subjects with object o;
RNG(s) denotes the number of different objects with subject s;
RNG(p) denotes the number of different objects with predicate p; and FACT (p) denotes the number of all triples with predicate p in said Resource Description Framework triple data storage system.

* * * * *